United States Patent
Spahlinger et al.

(10) Patent No.: US 7,961,373 B2
(45) Date of Patent: Jun. 14, 2011

(54) HIGH-RESOLUTION DIGITAL PHASE MODULATOR FOR A FIBER-OPTIC SIGNAL TRANSMISSION OR MEASUREMENT DEVICE

(75) Inventors: Guenter Spahlinger, Stuttgart (DE); Alfons Newzella, Gundelfingen (DE); Sven Voigt, Freiburg (DE)

(73) Assignee: LITEF GmbH, Freiburg (DE)

( * ) Notice: Subject to any disclaimer, the term of this patent is extended or adjusted under 35 U.S.C. 154(b) by 1386 days.

(21) Appl. No.: 10/546,377

(22) PCT Filed: Feb. 19, 2004

(86) PCT No.: PCT/EP2004/001640

§ 371 (c)(1), (2), (4) Date: Aug. 19, 2005

(87) PCT Pub. No.: WO2004/074914

PCT Pub. Date: Sep. 2, 2004

(65) Prior Publication Data

US 2006/0209306 A1    Sep. 21, 2006

(30) Foreign Application Priority Data

Feb. 21, 2003 (DE) .................................. 103 07 526

(51) Int. Cl.
*G02F 1/03* (2006.01)
*G02F 1/01* (2006.01)
*G02F 1/035* (2006.01)

(52) U.S. Cl. ............ 359/245; 359/254; 359/279; 385/2; 385/3

(58) Field of Classification Search .................. 359/237, 359/238, 245, 254, 279; 385/2, 3, 8, 40; 356/460, 464, 477
See application file for complete search history.

(56) References Cited

U.S. PATENT DOCUMENTS

| 5,137,359 A | 8/1992 | Steele ............................... 385/3 |
| 5,237,629 A | 8/1993 | Hietala et al. .................. 356/464 |
| 6,760,111 B1 * | 7/2004 | Mark et al. ..................... 356/464 |

FOREIGN PATENT DOCUMENTS

| DE | 19629260 | 2/1998 |
| DE | 19753427 | 2/1999 |
| GB | 2185123 | 7/1987 |
| WO | 9928707 | 7/1999 |

OTHER PUBLICATIONS

Article: Vawter et al., "Digital Optical Phase Control in Ridge-Waveguide Phase, Modulators," IEEE Photonics Technology Letters, vol. 5, No. 3 (Mar. 1993), pp. 313-315.

* cited by examiner

*Primary Examiner* — Ricky Mack
*Assistant Examiner* — Jack Dinh
(74) *Attorney, Agent, or Firm* — Elliott N. Kramsky

(57) ABSTRACT

A digital phase modulator for a fiber-optic measurement device. A predetermined total number of electrodes of different lengths are arranged in parallel and on both sides of a light guidance path in or on an optical substrate. The electrodes are arranged in two or more triples along the light guidance path. In each case, two electrodes of successive length within a triple have the same length ratio with respect to one another. Such length ratio is chosen, in particular, to be $v=1.618$. The electrode lengths of this triple are chosen such that the smallest step widths of the output value range of the phase modulator can be formed by subtraction between the values of at least two larger electrodes. This allows the resolution of the phase modulator to be increased from 9 bits to 11 bits without change in chip size.

21 Claims, 3 Drawing Sheets

HIGH-RESOLUTION DIGITAL PHASE MODULATOR FOR A FIBER-OPTIC SIGNAL TRANSMISSION OR MEASUREMENT DEVICE

BACKGROUND

1. Field of the Invention

The present invention relates to digital phase modulators. More particularly, the invention pertains to a digital phase modulator for a fiber-optic signal transmission or measurement device of the type that includes a fixed number of electrodes of different lengths arranged in parallel and on both sides of a light guidance path in or on an optical substrate.

2. Description of the Prior Art

It is known to apply the same potentials to the electrodes of a phase modulator for drive purposes. The potentials result in a positive or negative shift in the light phase at the output of the modulator depending on the positions of the electrodes with respect to the light guidance path. (Electrodes are also referred to as "positive" and "negative" electrodes.)

Patent specification DE 197 53 427 C1 discloses a low-significance component of a binary drive signal, supplied via a digital/analog converter with a downstream driver, to a specific, separate analog electrode in an otherwise digital phase modulator. This increases the accuracy of the phase modulator, which is formed from binary-weighted flat electrodes, for a fiber-optic signal transmission or measurement device (preferably for a fiber-optic interferometer). The patent specification also teaches storing correction values, which can be associated individually with the electrodes of the phase modulator, in a memory table to correct production-dependent inaccuracies in the electrode lengths and areas, and, thus, the phase modulation values. This solution increases resolution at the cost of comparatively large technical complexity that results from the need to use a D/A converter with a driver, whose analog initial values are, of limited temperature stability. When using such a phase modulator in a fiber-optic gyroscope (FOGs) with closed control loop comprising restoration electronics that produces a digital restoration signal of relatively high resolution (e.g. a 12-bit signal) for gyroscope restoration and for other fiber-optic signal-transmission and measurement devices, it is desirable that the resolution of the digital phase modulator exceed that previously possible.

One problem in the production of digitally driven integrated-optical modulators (e.g. for FOGs implemented in a multifunctional integrated-optical chip (MIOC)) is the achievable and/or reproducible resolution of electrode lengths. Based on voltage $U_l$ and a minimum length of the least significant (LSB) electrode of about 40 µm, an overall electrode length of about 10 mm is required for a 9-bit converter that can be relatively well implemented. If one were to attempt to reduce the minimum length of the LSB electrode further, considerable inaccuracies would occur as a result of field distortion. Relative accuracy of the LSB value could not be achieved, due to production tolerances. An electrode length of 80 mm would be required for a 12-bit converter. Based on such requirements for $U_l$ and the LSB length of the shortest electrode this is neither feasible nor realistic due to the considerable increase in physical length. Overall modulator length is limited to a few centimeters due to the technological constraints mentioned above and others.

SUMMARY AND OBJECTS OF THE INVENTION

It is therefore an object of the present invention to provide a digital phase modulator for a fiber-optic signal-transmission or measurement device, of considerably increased resolution without increased physical length.

The present invention addresses the receding and other objects by providing, in a first aspect, a digital phase modulator for a fiber-optic signal transmission or measurement device. Such phase modulator has a predetermined total number of electrodes of different lengths arranged in parallel on both sides of a light guidance path in or on an optical substrate. Preferably identical control potentials can be applied to the electrodes on both sides of the light guidance path in such a way that a large number of phase valves can be set by changing the drive selection of electrode combinations within a predetermined value range.

The electrodes of the phase modulator are arranged in two or more triples along the light guidance path. In each case, two electrodes of successive length of a triple have the same length ratio v with respect to one another.

In a second aspect, the invention provides a digital phase modulator of the type described in the first paragraph of the first aspect of the invention in which the electrodes are arranged in two or more triples along the light guidance path. In each case, two electrodes of successive length within a triple are of the same length ratio with respect to one another within one triple from the second to the most significant (MSB) triple. The electrode lengths of the first, least significant (LSB) triple are chosen such that the smallest step widths of the output value range of the phase modulator can be formed by subtraction between the values of at least two larger electrodes.

The preceding and other features of the invention will become further apparent from the detailed description that follows. Such description is accompanied by a set of drawing figures. Numerals of the drawing figures, corresponding to those of the written description, point to the features of the invention with like numerals referring to like features throughout both the drawing figures and the written description.

DETAILED DESCRIPTION OF THE PREFERRED EMBODIMENT

Figure 1:
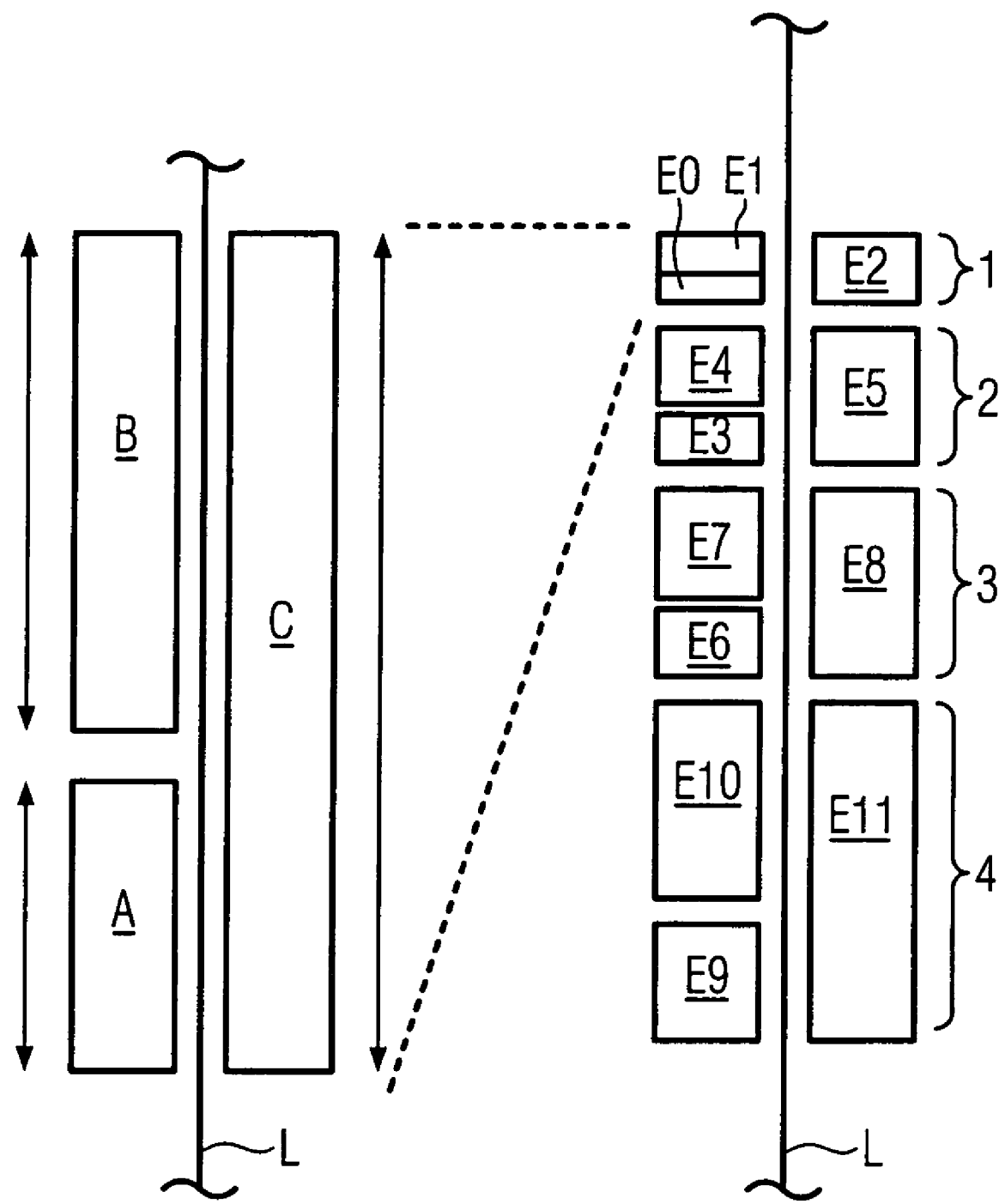
FIG. 1 is a diagram that illustrates a subdivision and arrangement of the electrodes in a non-binary phase modulator in accordance with the invention.

FIG. 1 is a schematic diagram that illustrates the basic design of a digital phase modulator in accordance with the invention. A detailed section of an electrode triple with the two shorter electrodes A, B is shown on the left-hand side with the largest electrode C shown on the right-hand side, to assist identification of a light guidance path L (indicated schematically) within the substrate of the MIOC (not shown in FIG. 1).

In accordance with the first fundamental concept of the invention, two electrodes of successive size have the same size ratio v with respect to one another. This results in the following relationship, using the electrode values a, b, c for the electrodes A, B, C:

$$\frac{b}{a} = \frac{c}{b} = v \qquad \text{(Equation 1)}$$
$$c = a + b$$

it follows that:

$$c = v^2 \cdot a$$
$$1 = v^2 - v \qquad \text{(Equation 2)}$$

so that the size ratio v is:

$$v = \frac{1}{2} + \sqrt{\frac{5}{4}} \; 1.618. \qquad \text{(Equation 3)}$$

If the values $a_1$, $b_1$, $c_1$ ... $a_4$, $b_4$, $c_4$ (see the following list) are assigned to the electrodes E0 to E11 (contained in the four electrode triples 1 to 4 of FIG. 1) within a triple then, observing the above requirement, this results, for example, in the condition $a_2 = v \cdot c_1$.

The power series 1, v, $v^2$, $v^3$ ... that results must also be multiplied by the mathematical sign of the field strength direction within the phase modulator. For example, the electrodes on the right-hand side in FIG. 1 (i.e. the electrode C in the detailed section) each act on the phase of the light with an opposite mathematical sign to that of the electrodes A, B on the other side of the light guidance path L.

TABLE 1

Value list for electrodes (see FIG. 1)

| Electrodes | Value allocation in the triple |
|---|---|
| E0 | $a_1$ |
| E1 | $b_1$ |
| E2 | $c_1$ |
| E3 | $a_2$ |
| E4 | $b_2$ |
| E5 | $c_2$ |
| E6 | $a_3$ |
| E7 | $b_3$ |
| E8 | $c_3$ |
| E9 | $a_4$ |
| E10 | $b_4$ |
| E11 | $c_4$ |

This results in the weights or value sequences listed in Table 2:

TABLE 2

| Value sequence | |
|---|---|
| 1 | 1.00 |
| v | 1.62 |
| $v^2$ | -2.62 |
| $v^3$ | 4.23 |

TABLE 2-continued

| Value sequence | |
|---|---|
| $v^4$ | 6.85 |
| $v^5$ | -11.09 |
| $v^6$ | 17.94 |
| $v^7$ | 29.03 |
| $v^8$ | -46.97 |
| $v^9$ | 75.99 |
| $v^{10}$ | 122.96 |
| $v^{11}$ | -198.96 |

The initial condition (Equation 1) implies that all of the combinations a+b+c=0 disappear. This results in seven different output values for each electrode triple. Twelve different states result for four electrode triples, as identical combinations occur due to the relationship $v^3 = v^2 + n$. The length ratio between the longest and the shortest electrode is 1:259.

The condition a+b=c (Equation 1) for opposed electrodes limits the maximum number of output values that can be described by 12 bits independent of the length ratios of the triples with respect to one another. Since a zero is produced with two different bit combinations [000] and [111] in each triple, seven different values can be represented. For the four electrode triples 1 to 4 shown in FIG. 1, this results in $7^4 = 2041$ values (i.e., is to say a resolution of approximately ±10 bits).

The second basic embodiment of the invention is based on the electrode configuration and subdivision shown in FIG. 1. That is, it is also based on the non-binary 1.618 configuration. It differs by avoiding value range overlaps between individual electrode triples.

To satisfy this leads to Equation 4 below. Such equation states that the smallest electrode in a triple should be larger by a unit step width |1| than the sum of the lengths of all the smaller electrode triples. That is, $$a_x = l_{x,0} = \left( \sum_{i=0}^{x-1} \left( \sum_{j=0}^{2} |l_{i,j}| \right) \right) + 1 \text{ for } x \in \{1, 2, 3\} \qquad \text{(Equation 4)}$$

The variable $l_{i,j}$ denotes the electrode lengths, with
  the index "i" denoting the triple number {0, 1, 2, 3 ... }, and
  the index "j" indicating the number of the electrode in the respective triple {0, 1, 2}.
In other words, "$l_{i,j}$" thus represents the length of the j-th electrode of the i-th triple.

The length of the respective central electrode $b_x$ is twice that of $a_x$, i.e., $b_x = 2 a_x$. The largest electrode length $c_x$ within a triple is given by the sum of $a_x$ and $b_x$ ($c_x = a_x + b_x$).

The resultant bit weights are summarized, by way of example, in Table 4, below. The association between the electrode designations l and the triple-internal electrode designations a, b, c is employed to better illustrate the situation and to avoid double indexing for the position association.

TABLE 4

Value sequence with the approach according to Equation 4

| Variable | Position | Value |
|---|---|---|
| $l_{0,0}$ | $a_0$ | 1 |
| $l_{0,1}$ | $b_0$ | 2 |
| $l_{0,2}$ | $c_0$ | -3 |
| $l_{1,0}$ | $a_1$ | 7 |
| $l_{1,1}$ | $b_1$ | 14 |
| $l_{1,2}$ | $c_1$ | -21 |

TABLE 4-continued

Value sequence with the approach according to Equation 4

| Variable | Position | Value |
|---|---|---|
| $l_{2,0}$ | $a_2$ | 49 |
| $l_{2,1}$ | $b_2$ | 98 |
| $l_{2,2}$ | $c_2$ | −147 |
| $l_{3,0}$ | $a_3$ | 343 |
| $l_{3,1}$ | $b_3$ | 686 |
| $l_{3,2}$ | $c_3$ | −1029 |

The size ratio between the LSB and MSB combination is, in this case, 1:1029. The totality of the bit combinations shown in Table 4 results in 2400 different output values. The maximum possible number of output values for this electrode configuration is therefore considerably greater than for the first embodiment of the invention.

The magnitudes of the intervals between adjacent values are "0" or "1". No other intervals occur with this distribution. Resolution is thus about eleven (11) bits for the value range covered.

To further improve the size ratio between the longest and shortest electrodes in accordance with the above, the electrodes in the LSB triple 1 may be enlarged on the basis of Table 4. This is illustrated by way of example in Table 5, below.

According to this further species of the second embodiment of the invention, the smallest output values are no longer formed by driving individual electrodes, but by subtraction between at least two larger electrodes.

The value range, covered in a linear form, thus varies only insignificantly. However, the size ratio between the smallest and largest electrode is now only 5:1029=1:206, as can be seen, e.g., from Table 5.

TABLE 5

Value sequence with the approach based on Equation 4 with a modified LSB triple (see FIG. 1)

| Position | Value |
|---|---|
| $a_0$ | 5 |
| $b_0$ | 6 |
| $c_0$ | −11 |
| $a_1$ | 7 |
| $b_1$ | 14 |
| $c_1$ | −21 |
| $a_2$ | 49 |
| $b_2$ | 98 |
| $c_2$ | −147 |
| $a_3$ | 343 |
| $b_3$ | 686 |
| $c_3$ | −1029 |

For the length ratios of the electrodes of the larger electrode triples (i.e., from the second least significant electrode triple), the smallest electrode $a_x$ is once again calculated, from Equation (4), as:

$$a_x = \left( \sum_{i=0}^{x} \left( \sum_{j=0}^{2} |l_{i,j}| \right) \right) + 1$$

The length of the central electrode $b_x$ is twice that of $a_x$, i.e., $b_x = 2 a_x$. The greatest electrode length $c_x$ within a triple is given by the sum of $a_x$ and $b_x$, i.e., $c_x = a_x + b_x$. The electrodes in the lowest triple are lengthened by precisely "5" primarily because the length ratio (~1:206) achieved in this way is within a range that can be well managed.

Fundamentally, this improvement to the production capability of the electrode structure sought is subject to the following considerations: the triple structure (c=a+b) should be retained in the design, and the resultant output characteristic should have no discontinuities in the central area. The latter requires that the values 0, ±1, ±2 . . . can be produced.

The smallest value that can be produced by the triple above the lowest triple is ±7 in the example shown in Table 5. The values from 1 to 6 must therefore be generated by connection of the lower triple. The −1, for example, is formed as the sum of the 6, the 14 and −21.

As a general statement, it is necessary that:
all the values from 1 to 6 can be constructed by addition or subtraction between up to two electrodes in the lowest triple and the magnitude of an electrode in the next triple, or zero.
no electrode weighting is carried out twice.

The generalization of the constraints for lengthening the electrodes in the lowest triple is:
The new electrode length $l'_{i,j}$ can be produced by a combination of a previously chosen electrode length and the length of an electrode in another triple (linear combination)

$$l'_{i,j} = \pm l_{i,j} \pm l_{k,l} \text{ where } i \neq k \qquad \text{(Equation 5)}$$

The index "i" again denotes the triple number {1, 2, 3 . . . }, while the index "j" denotes the number of the electrode in the respective triple {0, 1, 2}. Analogous to "i", the index "k" denotes a triple number. It is the number of the triple from which the second electrode length can be taken. In addition, the new lengths must once again satisfy the condition a+b=(−)c. If this condition is not satisfied, then the length of the longest electrode ($l_{3,2}$) in the lowest third must be adapted by the appropriate difference in accordance with the following relationship:

$$l'_{3,2} = l_{3,2} + \left( \sum_{j=0}^{2} l'_{0,j} \right) \qquad \text{(Equation 6)}$$

This allows the following exemplary combinations to be represented for the lowest triple:
1, 2, −3 (Output distribution: Table 4)
2, 4, −6
2, 8, −10
3, 5, −8
3, 6, −9
5, 6, −11 (Table 5)
5, 10, −15
6, 10, −16
6, 12, −18
8, 9, −17.

In the last example, the electrode with value $a_0$ is already larger than the smallest electrode of the following triple. Thus any further lengthening of the lower triple with respect to reduction of the length ratios does not provide any further advantage.

The "5" was chosen as the start value in Table 5—as already described—due to the fact that the length ratio of the longest electrode to the shortest electrode has been sufficiently reduced. Furthermore, this combination can be easily produced by constant increase in the original lengths of the values of $a_0$ and $b_0$ (from Table 4).

As can be seen, in principle, the elementary triple structure of the first described embodiment applies to the second fundamental embodiment of the invention, with the length ratios being converted to binary form from the second electrode triple. The size of the area covered linearly by a basic step width (for example |1|) extends from −1192 to +1194. Once again, the resolution is (approximately) 11 bits.

Figure 3:
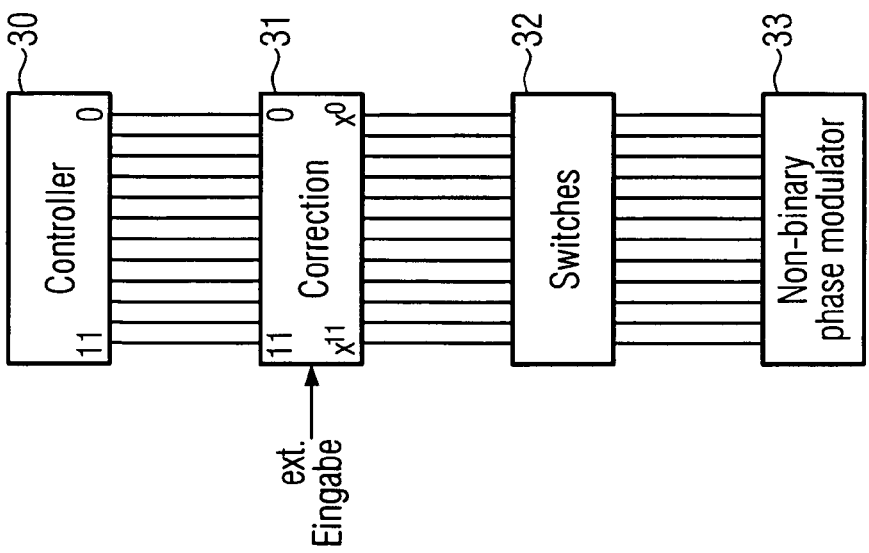
FIG. 3 is a block diagram of a basic arrangement for electronic correction or conversion of binary values to non-binary values for application to the individual electrodes in a phase modulator in accordance with the invention.

If binary signal processing is intended to be provided within the drive electronics for a phase modulator according to the invention (generally the case), a non-binary phase modulator according to the invention can be used with the aid of a correction table that converts the calculated digital values to non-binary values. The correction table can be designed to be programmable in memory. In addition to the conversion from binary to non-binary values, it can also correct production-dependent, or operation-dependent faults and errors in the phase modulator. FIG. 3 illustrates the basic circuit design. The binary values that correspond to a specific phase value are supplied from a control device (controller) 30 to a conversion or correction table 31. The table 31 controls a downstream switch 32 through which the individual electrodes E0 to E11 of the phase modulator 33 are driven with a signal combination that corresponds to the non-binary value.

Figure 4:
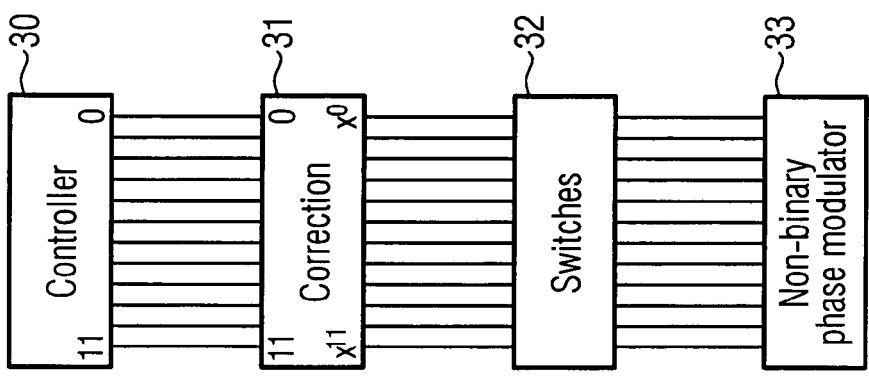
FIG. 4 is a block diagram, corresponding to that illustrated in FIG. 3, of the layout of a correction table with an external correction capability.

The modified embodiment of the conversion and correction circuit shown in FIG. 4 allows an external signal to be supplied to the correction table, (e.g. a temperature signal or a signal which takes account of age-dependent changes, as a readjustment correction).

Figure 5:
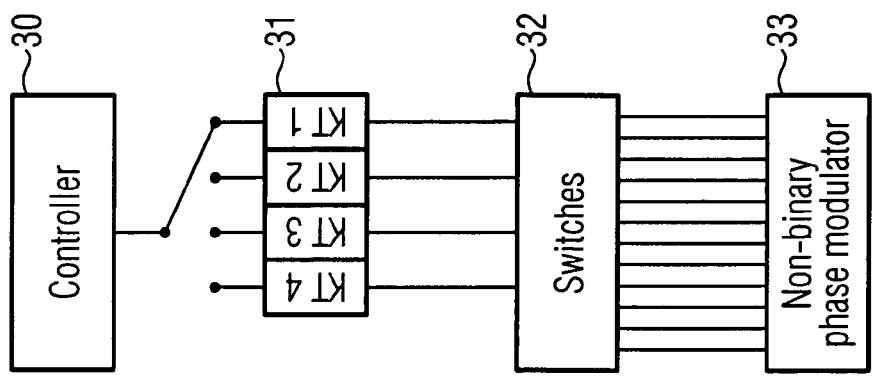
FIG. 5 is a modified block diagram layout of the circuit arrangement of FIG. 3, which permits selective switching between two or more correction tables stored in a memory.

The illustrated example of the conversion and correction circuit shown in FIG. 5 has two or more, (e.g. four), correction tables KT1 to KT4. These may be integrated in an ASIC and likewise make it possible to use an optimized correction table in each case as a function of an external signal.

The invention thus provides a digital phase modulator with considerably increased resolution without requiring an excessive length ratio (e.g. one that corresponds to a value of $1:2^{11}$).

Figure 2:
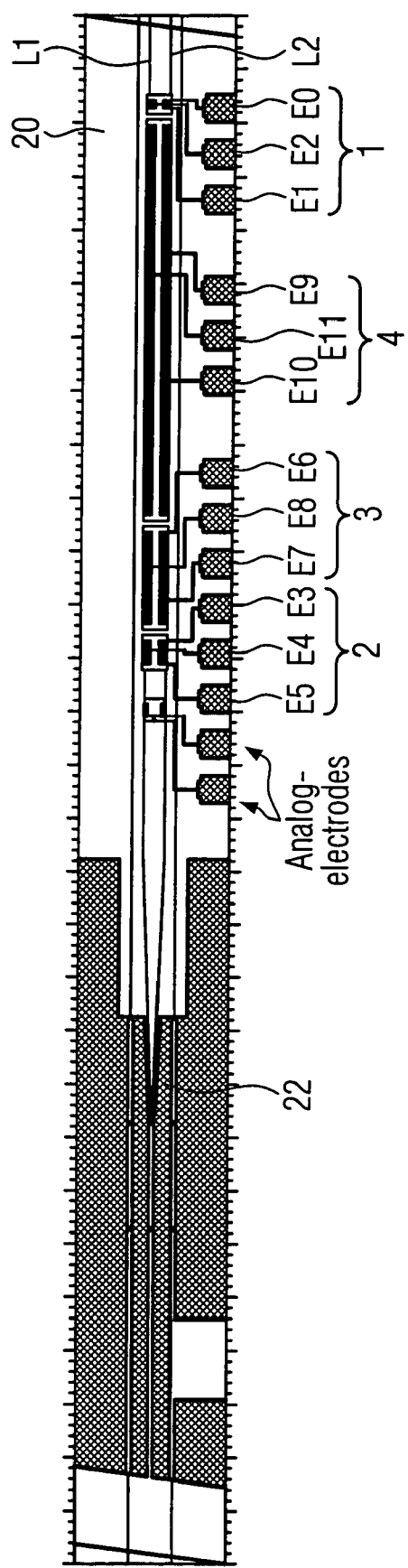
FIG. 2 is a diagram of the layout of an integrated-optical chip illustrated as a subsection of an MIOC of a fiber-optic gyroscope following a beam splitter (Y splitter)

FIG. 2 illustrates a specific exemplary embodiment of the invention relating to the MIOC of a fiber-optic gyroscope with a closed control loop. After a splitter 22 (Y splitter), two parallel light guidance paths L1, L2 run in the substrate of an MIOC 20 for the forward and backward paths of a polarized light wave. The light wave passes through the measurement coil of an FOG and is acted on by a digital phase modulator with a parallel double configuration of the same phase, but the opposite mathematical sign, on the forward and backward paths. The phase modulator, which is in the form of a parallel double version, is, according to the invention, split into four electrode triples. These are annotated with the reference numbers 1 to 4 as in FIG. 1. The drive connections for the electrodes are provided along the lower edge of the MIOC substrate in FIG. 2, and are annotated E0 to E11 in a manner corresponding to FIG. 1. The overall length of this phase modulator arrangement on the MIOC chip is, for example, about 10 mm.

It is particularly advantageous for the two shorter electrodes E0, E1 in the first low significance (LSB) triple to have the respective length values $a_1=|5|$ and $b_1$ |6|, and, for the longest electrode (E2) of this triple to have the length value $c_1=|11|$. At the same time, the length ratio v for the electrode lengths ($a_2$ to $c_4$) of all the other, more significant electrodes E3 to E11 is:

$$v = \frac{1}{2} + \sqrt{\frac{5}{4}} \; 1.618. \quad \text{(Equation 3)}$$

If a phase modulator according to the invention is intended to be operated with binary values, an electronic correction table can be employed for conversion of binary phase values to the non-binary drive values for the electrodes. Such correction table may be programmable in memory. In particular, it may also contain correction values for correction of production-dependent and/or operation-dependent faults and errors in the phase modulator. It may also be advantageous to provide at least two differently programmed correction tables, between which it is possible to switch by means of a control device, as a function of an external parameter, (e.g. temperature).

While this invention has been described with reference to its presently-preferred embodiment, it is not limited thereto. Rather, the invention is limited only insofar as it is defined by the following set of patent claims and includes within its scope all equivalents thereof.

What is claimed is:

1. A digital phase modulator for a fiber-optic signal transmission or measurement device, which has a predetermined total number of electrodes of different length which are arranged parallel and on both sides of a light guidance path in or on an optical substrate, in which case identical control potentials can be applied to the electrodes on both sides of the light guidance path, in such a way that a large number of phase values for a light wave which is running on the light guidance path can be set by changing the drive selection of electrode combinations within a predetermined value range, characterized in that the electrodes are arranged in two or more triples along the light guidance path, with in each case two electrodes of successive length within a triple having the same length ratio with respect to one another.

2. The phase modulator as claimed in claim 1, characterized in that the respective longest electrode in a triple is arranged on one side of the light guidance path and the two other shorter electrodes are arranged along the other side of the light guidance path, on or in the substrate.

3. The phase modulator as claimed in claim 1, characterized in that the length ratio is:

$$v = \frac{1}{2} + \sqrt{\frac{5}{4}} \; 1.618.$$

4. The phase modulator as claimed in claim 1, characterized by an electronic correction table, which is associated with the phase modulator, for conversion of binary phase values to nonbinary drive values for the electrodes.

5. A digital phase modulator for a fiber-optic signal transmission or measurement device, which has a predetermined total number of electrodes of different length which are arranged parallel and on both sides of a light guidance path in or on an optical substrate, in which case identical control potentials can be applied to the electrodes on both sides of the light guidance path, in such a way that a large number of phase values for a light wave which is running on the light guidance path can be set by changing the drive selection of electrode combinations within a predetermined value range, characterized in that
the electrodes are arranged in two or more triples along the light guidance path, with
the longest electrodes of successive triples having the same length ratio with respect to one another from the second to the most significant triple,
the electrode length ratios of the electrode triples above the first low significance triple being defined such that the length of the respectively shortest electrode value is:

$$a_x = l_{x,0} = \left( \sum_{i=0}^{x-1} \left( \sum_{j=0}^{2} |l_{i,j}| \right) \right) + 1 \text{ for } x \in \{1, 2, 3\}$$

where the index "I" denotes the triple number and the indes "j" indicates the number of the respective electrode in the triple, and the length of the respective central electrode is governed by the relationship $b_x=2a_x$, and the length of the respectively longest electrode is given by the relationship $c_x=a_x+b_x$, and the electrode lengths of the first, least significant triple being chosen such that the smallest step widths of the light phase in the output value range of the phase modulator can be formed by subtraction between the associated phase values of at least two larger electrodes, and in order to reduce the length ratio of the longest to the shortest electrode in the modulator in the lowest triple, its electrodes are relatively lengthened such that an additive combination of the values of the two shorter electrodes results in the length value of the longest electrode in this lowest triple.

6. The phase modulator as claimed in claim 5, characterized in that the respectively longest electrode in a triple is arranged on one side of the light guidance path, and the two other, shorter electrodes are arranged on the other side of the light guidance path, and in that the sum of the lengths of the two shorter electrodes is equal to the length of the longest electrode.

7. The phase modulator as claimed in claim 6, characterized in that the electrode length ratios of the electrode triples above the lowest triple are defined such that the length ($l_{x,o}$) of the respectively shortest electrode value ($a_x$) is:

$$a_x = l_{x,0} = \left( \sum_{i=0}^{x-1} \left( \sum_{j=0}^{2} |l_{i,j}| \right) \right) + 1 \text{ for } x \in \{1, 2, 3\},$$

where the index "i" denotes the triple number $\{0, 1, 2, 3 \ldots\}$, and the index "j" indicates the number of the respective electrode in the triple $\{0, 1, 2\}$, and the length ($b_x$) of the respective central electrode is governed by the relationship $b_x=2a_x$, and the length ($c_x$) of the respectively longest electrode is given by the relationship $c_x=a_x+b_x$, and in that the electrodes in the lowest (first) triple are lengthened such that an additive combination of the values of the two shorter electrodes ($E_0$, $E_1$) results in the length value of the longest electrode (E2) in this lowest triple.

8. The phase modulator as claimed in claim 5, characterized in that the two shorter electrodes in the lowest triple have the respective length values $a_0=|5|$ and $b_0=|6|$ and the longest electrode ($E_2$) in this triple has the length value $c_0=|11|$.

9. The phase modulator as claimed in claim 5, characterized in that the two shorter electrodes in the lowest triple have the respective length values $a_0=|2|$ and $b_0=|4|$ and the longest electrode ($E_2$) in this triple has the length value $c_0=|6|$.

10. The phase modulator as claimed in claim 5, characterized in that the two shorter electrodes in the lowest triple have the respective length values $a_0=|2|$ and $b_0=|8|$ and the longest electrode ($E_2$) in this triple has the length value $c_0=|10|$.

11. The phase modulator as claimed in claim 5, characterized in that the two shorter electrodes in the lowest triple have the respective length values $a_0=|3|$ and $b_0=|5|$ and the longest electrode ($E_2$) in this triple has the length value $c_0=|8|$.

12. The phase modulator as claimed in claim 5, characterized in that the two shorter electrodes in the lowest triple have the respective length values $a_0=|3|$ and $b_0=|6|$ and the longest electrode ($E_2$) in this triple has the length value $c_0=|9|$.

13. The phase modulator as claimed in claim 5, characterized in that the two shorter electrodes in the lowest triple have the respective length values $a_0=|5|$ and $b_0=|10|$ and the longest electrode ($E_2$) in this triple has the length value $c_0=|15|$.

14. The phase modulator as claimed in claim 5, characterized in that the two shorter electrodes in the lowest triple have the respective length values $a_0=|6|$ and $b_0=|10|$ and the longest electrode ($E_2$) in this triple has the length value $c_0=|16|$.

15. The phase modulator as claimed in claim 5, characterized in that the two shorter electrodes in the lowest triple have the respective length values $a_0=|6|$ and $b_0=|12|$ and the longest electrode ($E_2$) in this triple has the length value $c_0=|18|$.

16. The phase modulator as claimed in claim 5, characterized in that the two shorter electrodes in the lowest triple have the respective length values $a_0=|8|$ and $b_0=|9|$ and the longest electrode ($E_2$) in this triple has the length value $c_0=|17|$.

17. The phase modulator as claimed in claim 9, characterized by an electronic correction table, which is associated with the phase modulator, for conversion of binary phase values to nonbinary drive values for the electrodes.

18. The phase modulator as claimed in claim 17, characterized in that the correction table is designed to be programmable in memory.

19. The phase modulator as claimed in claim 10, characterized in that, in addition to binary/nonbinary conversion, the correction table contains correction values for correction of production-dependent and/or operation-dependent faults and errors in the phase modulator.

20. The phase modulator as claimed in claim 11, characterized in that at least two differently programmed correction tables are provided, between which it is possible to switch by means of a control device, as a function of an external parameter.

21. The phase modulator as claimed in claim 12, characterized in that the external parameter is the temperature.

* * * * *